United States Patent [19]

Ohsumi

[11] Patent Number: 5,121,785
[45] Date of Patent: Jun. 16, 1992

[54] IMPROVED SLAT FOR BLINDS

[75] Inventor: Hisayoshi Ohsumi, Shizuoka, Japan

[73] Assignee: Yamaha Corporation, Japan

[21] Appl. No.: 200,035

[22] Filed: May 27, 1988

[30] Foreign Application Priority Data

Jun. 1, 1987 [JP] Japan .................. 62-85630[U]
Aug. 27, 1987 [JP] Japan .................. 62-130734[U]
Nov. 11, 1987 [JP] Japan .................. 62-172266[U]
Apr. 4, 1988 [JP] Japan .................. 63-82550

[51] Int. Cl.⁵ .............................................. E06B 9/00
[52] U.S. Cl. ................................................. 160/236
[58] Field of Search ............... 160/236, 168.1; 156/65, 156/178, 177

[56] References Cited

U.S. PATENT DOCUMENTS

| | | | |
|---|---|---|---|
| 1,639,474 | 8/1927 | Whitmore | 160/236 |
| 2,068,977 | 1/1937 | Dodge | 160/236 |
| 2,156,163 | 4/1939 | Pierce | 160/236 |
| 2,174,249 | 9/1939 | Pratt | 160/236 |
| 2,926,729 | 3/1960 | Zanini | 160/236 |
| 3,645,317 | 2/1972 | Malone | 160/236 X |
| 4,309,472 | 1/1982 | Gotting et al. | 160/236 X |

FOREIGN PATENT DOCUMENTS 8500849 2/1985 PCT Int'l Appl. ................. 160/236

Primary Examiner—David M. Purol
Attorney, Agent, or Firm—Ostrolenk, Faber, Gerb & Soffen

[57] ABSTRACT

A slat for blinds such as Venetian blinds made up of a core plate made of metal, FRP or wood and a pair of surface layers laminated on both faces of the core plate via intermediates. The laminated construction well suppresses generation of harsh noises otherwise caused by slat colliding and dewing even when used in wet environments.

13 Claims, 3 Drawing Sheets

Fig. 1
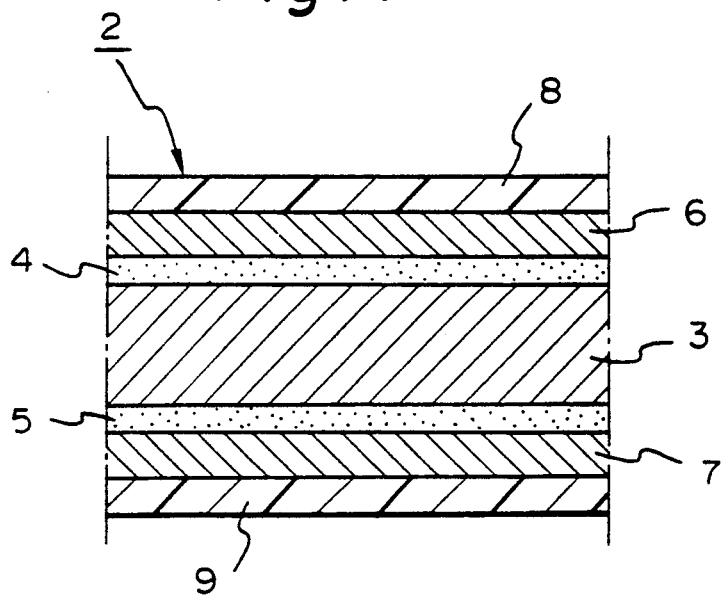
Fig. 2A
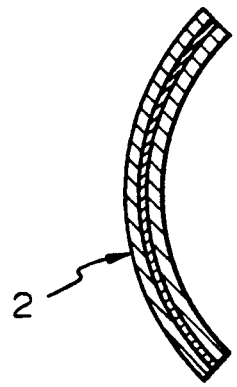
Fig. 2B
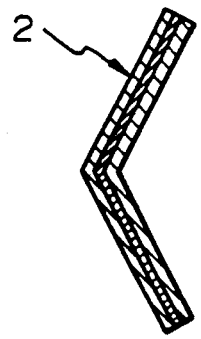
Fig. 2C
Fig. 3
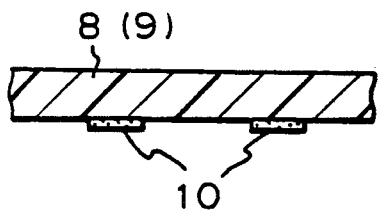

IMPROVED SLAT FOR BLINDS

BACKGROUND OF THE INVENTION

The present invention relates to an improved slat for blinds such as Venetian and vertical blinds.

A Venetian blind typically includes a number of slats in the form of elongated thin plates generally made of light metals such as Al or Al alloys. The slats are connected to each other in vertical superposition by means of ladder tapes. By manual operation on a lift cord, the slats are collected upwards in order to open the blind. Further, by manual operation on a tilt cord, angle of the slats are concurrently changed in order to adjust the amount of light passing through the blind.

Each slat is given in the form of a thin metallic plate coated on both faces with opaque colours. Optionally grain pattern printing may be applied to the faces of the thin plate.

A slat for blinds is in general expected to fulfill the following properties.

(I) It should give a rich woody impression and have a highly aesthetic appearance.

(II) It should have sufficient strength together with flexibility high enough to toughly recover from bending and contortion.

(III) It should have a thickness of about 1 mm or smaller but, nevertheless, not lose structural stability.

(IV) It should be impervious to changes in environmental conditions such as temperature and humidity.

The above-described conventional slat does not meet these requirements. First its appearance is rather simple and poor in aesthetic effect. When a blind is swayed by wind, metallic slats frequently collide against each other to generate harsh noises. When used in a wet environment such as a bathroom direct contact of metallic slat with moisture in the air can easily cause the formation of dew as a result of the high thermal conductivity of the metallic material on the slats leads to quick corrosion problem. In addition, the relatively thin construction of the conventional metallic slats is in most cases incompatible with their structural stability and rich recoverbility from bending and contortion.

SUMMARY OF THE INVENTION

It is the basic object of the present invention to provide a sufficiently aesthetic slat for blinds which is sufficiently rich in strength and flexibility.

It is another object of the present invention to provide a thin but structurally stable slat for blinds which is highly impervious to changes in environmental conditions.

In accordance with the basic aspect of the present invention, a slat for blinds includes an elongated core plate and at least two elongated surface layers laminated on bath faces of the core plate via intermediates.

BRIEF DESCRIPTION OF THE DRAWINGS

FIG. 1 is a transverse cross-sectional view of one embodiment of the slat in accordance with the present invention, FIGS. 2A to 2C are transverse cross-sectional views of various types of configurated slats in accordance with the present invention, FIG. 3 is a fragmentary sectional view of another embodiment of the slat in accordance with the present invention accompanied with printed decoration patterns.

DESCRIPTION OF THE PREFERRED EMBODIMENTS

Figure 4:
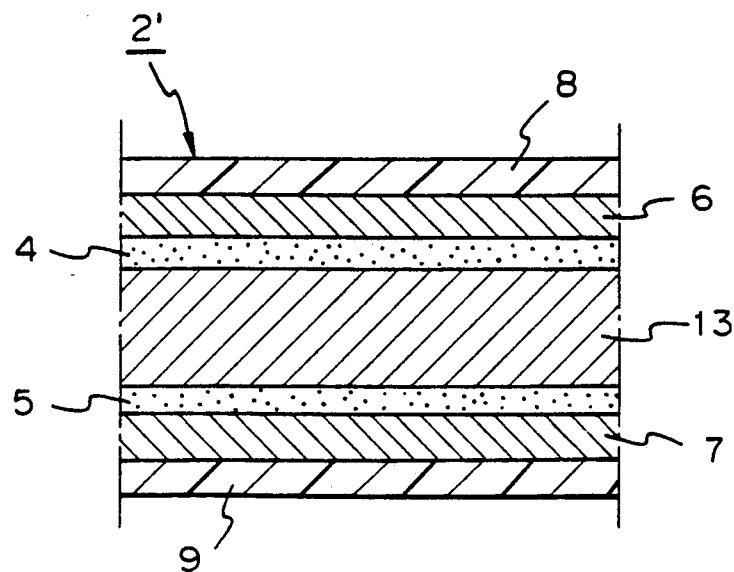
FIG. 4 is a transverse cross-sectional view of another embodiment of the slat in accordance with the present invention.

One embodiment of the slat in accordance with the present invention is shown in FIGS. 1 and 2, in which a slat 2 is made up of a metallic center plate 3, a pair of wooden plates 6 and 7 bonded to opposite faces of the center plate 3 by means of bond layers 4 and 5 and a pair of synthetic resin layers 8 and 9 coated on the exposed faces of the wooden plates 6 and 7.

In production of such a slat 2, and Al or Al alloy plate of, for example, 0.2 mm thickness is formed into a core plate 3 by cutting and both faces of the core plate 3 are coated with a bond such as urethane emulsion at a density of 100 g/m$^2$. Next, wooden plates 6 and 7 made of, for example, American walnut of 0.1 to 0.3 mm, more preferably 0.2 mm thickness, are attached to the coated faces of the core plate 3. The combination is heated at 150° C. under a pressure of 1.0 to 2.0 MPa for 5 min. Thereafter, the exposed faces of the wooden plates 6 and 7 are ground by grinding papers of #240 to #400 and next coated with colours made of urethane resin. After middle coating, the faces are again ground with grinding papers of #240 to #400 and subjected to finish coating to form the synthetic resin layers 8 and 9. By properly slicing the product, a flat slat such as shown in FIG. 2A is obtained. Optionally, configurated slats such as shown in FIGS. 2B and 2C can be obtained by proper press or roll forming.

Optionally, the synthetic resin layers 8 and 9 may be of transparent films. In this case, after the above-described middle coating, acrylic films of, for example, 35 μm thickness are applied to the coated faces of the wooden plates 6 and 7 and the combination is heated at 130° C. under a pressure of 2.0 MPa for 5 min to fuse of the films. Further, as shown in FIG. 3, decoration patterns 10 may be formed on at least one synthetic resin layer 8 or 9 by means of screen or gravure printing.

In one alternative, wooden plates 6 and 7 of 0.2 mm thickness may be used with non-woven fabric backings of 30 g/m$^2$ density. Pigments are preferably used for colour coating of the wooden plates 6 and 7. Further, in formation of the synthetic resin layers 8 and 9, a transparent film for the front side face may be used in combination with an opaque film for the rear side face of the slat 2.

In accordance with the present invention, the presence of the wooden plates on both faces of the metallic core plate restrains generation of harsh noises due to colliding of slats and thermal insulation by the wooden plate lowers the possibility of dew formation even when the slats are used in a humid environment. Further, presence of the wooden plate on the surface region of the slat well enhances its aesthetic value.

Another embodiment of the slat in accordance with the present invention is shown in FIG. 4, in which, as a substitute for the metallic core plate 3 used for the foregoing embodiment, a core plate 13 is made of fiber reinforced plastic (FRP).

In production of such a slat 2', a glass cloth of 100 g/m$^2$ density is coated with thermosetting resin such as powdery epoxy resin of 100 g/m$^2$ and the combination is heated at 130° C. under a pressure of 1.0 MPa for 20 min to form an FRP core plate 13 of thermal deformation at 105° C. Subsequent steps are substantially same as those employed in production of the foregoing embodiment.

Use of FRP for the core plate further reduces generation of noises due to colliding of slats.

Figure 5:
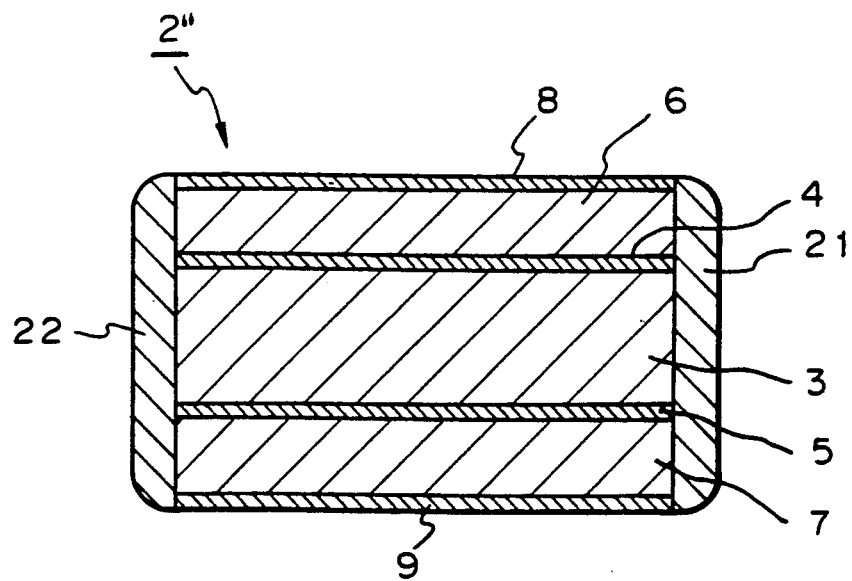
FIG. 5 is a transverse cross-sectional view of the other embodiment of the slat in accordance with the present invention.

The other embodiment of the slat in accordance with the present invention is shown in FIG. 5. The construction of this slat 2 is substantially same as that of the slat shown in FIG. 1 with the exception that side faces of the slat 2 are coated with synthetic resin layers 21 and 22 whose colour is close to that of the wooden plates 6 and 7. Thanks to presence of these synthetic resin layers 21 and 22, the side faces of the metallic core plate 3 are not exposed. The side faces of the slat 2" may additionally be furred. In this case, for example, the side faces of the slat are spray coated with urethane bond and, next, the slat is dipped in a bath filled with short fibers. The obtained slat has an appearance like a woven fabric.

In the other embodiment of the slat in accordance with the present invention, side faces of a slat are covered with anodic oxide layers. Such layers are formed by application of anodic oxidization and each produced slat has an elegant bronze colour of invar tint.

The presence of such additional side face layers shields the metallic core plate against corrosion otherwise caused by direct contact with the air.

Figure 6:
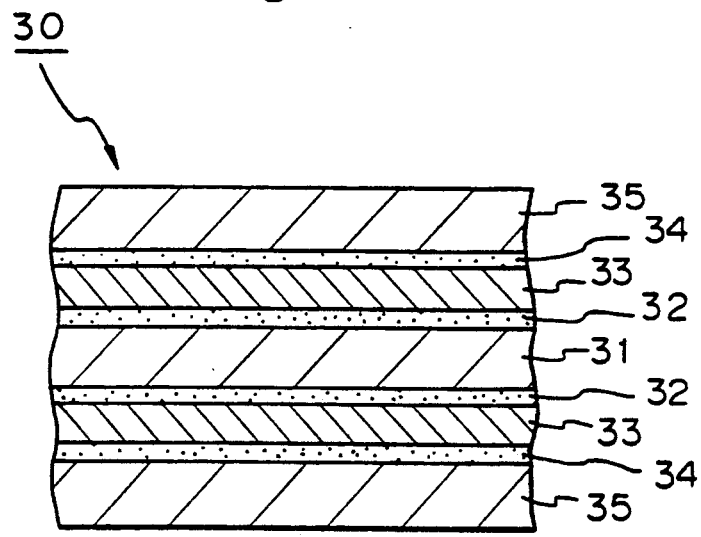
FIGS. 6 and 7 are transverse cross-sectional views of still other embodiments of the slat in accordance with the present invention.
Figure 7:
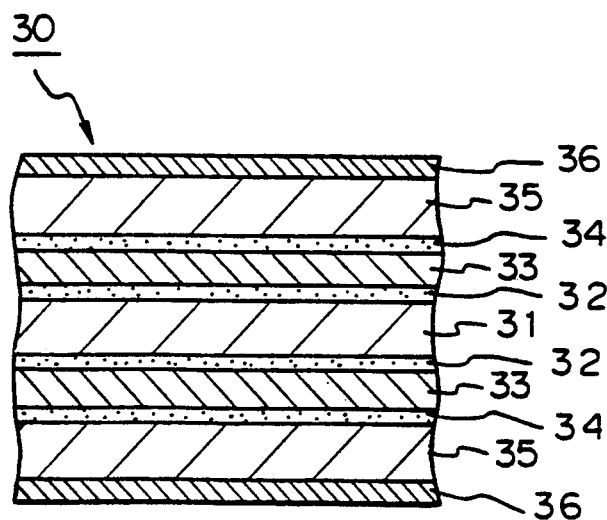

Still other embodiments of the slat in accordance with the present invention are shown in FIGS. 6 and 7.

In the case of the embodiment shown in FIG. 6, the slat 30 includes a wooden core plate 31, a pair of reinforcements 33 bonded to both faces of the core plate 31 by means of bond layers 32 and a pair of wooden plates 35 bonded to the faces of the reinforcements 33 by means of bond layers 34.

The wooden plates 31 and 35 are made of, for example, White oak, American wall nut and oak. The plate may accompany a non-woven fabric backing. The thickness of the plates is preferably in a range from 0.15 to 0.30 mm. In preparation, the wooden material may be impregnated with synthetic resin for high strength and structural stability. For example, a material plate may be impregnated in a synthetic resin bath at 50° C. for 1 to 24 hours. Preferably, ethylene glycol resin, acrylic resins and urethane resins are used for the bath.

The reinforcements 33 are made of, for example, cloths, non-woven fabrics and resin sheets made of glass fibers and synthetic fibers such as polymides and polyesters. A thickness from 0.03 to 0.10 mm is preferably employed. The density of the cloth and resin sheet is preferably be 50 g/m$^2$ or smaller. The resin sheet is preferably made of acrylic resins and polypropylene resins and its thickness is about 0.10 mm. Use of such resin sheets results in strong bonding between the superposed elements thanks to soaking of the bond layers into those sheets during heat press bonding.

In the case of the embodiment shown in FIG. 7, synthetic resin layers 36 are further formed on the faces of the wooden plates 35.

In lamination of the wooden plates 31 and 35, the grain directions of different wooden plates are parallel, normal or oblique to each other. Preferably, grain directions of different wooden plates should differ from each other a little so that strength and swelling of the slat are uniform in different directions.

The above-described metallic core plate is preferably made of Al, Al alloys, Fe and Fe alloys.

For bonding of adjacent plates, urethane resins, epoxy resins, or the like are usable.

I claim:
1. An improved slat for blinds, said slat comprising:
   an elongated core plate having first and second opposed main surfaces;
   first and second wood intermediate layers located adjacent said first and second main surfaces, respectively; and
   first and second synthetic resin layers being located adjacent said first and second intermediate layers, respectively.
2. An improved slat as claimed in claim 1 in which said slat is flat in its transverse cross-sectional profile.
3. An improved slat as claimed in claim 1 in which said slat is arcuate in its transverse cross-sectional profile.
4. An improved slat as claimed in claim 1 in which said slat is bent in its transverse cross-sectional profile.
5. An improved slat as claimed in claim 1 in which said core plate is made of metal.
6. An improved slat as claimed in claim 5 in which said metal is chosen from a group consisting of Al, Al alloys, Fe and Fe alloys.
7. An improved slat as claimed in claim 1 in which said core plate is made of fiber reinforced plastics.
8. An improved slat as claimed in claim 1 in which said core plate is made of wood.
9. An improved slat as claimed in claim 1 in which said wood is chosen from a group consisting of white oak, American walnut and oak.
10. An improved slat as claimed in claim 1 in which said slat has side faces and wherein said side faces are furred.
11. An improved slat as claimed in claim 1, wherein said synthetic resin layers are transparent or translucent.
12. An improved slat as claimed in claim 1, wherein said first and second intermediate layers cover substantially the entire surface of said first and second main surfaces of said core plate, respectively, and wherein said first and second synthetic resin layers cover the substantially entire expose surface of said first and second intermediate layers, respectively.
13. An improved slat as claimed in claim 1, wherein said first and second intermediate layers are bonded to said first and second main surfaces of said core plate, respectively, and said first and second resin layers are bonded to said first and second intermediate layers, respectively.

* * * * *